(12) United States Patent
Kakuyama et al.

(10) Patent No.: US 6,490,859 B2
(45) Date of Patent: Dec. 10, 2002

(54) ENGINE EXHAUST PURIFICATION DEVICE

(75) Inventors: Masatomo Kakuyama, Yokohama (JP); Osamu Matsuno, Ayase (JP); Shigeaki Kakizaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/790,725

(22) Filed: Feb. 23, 2001

(65) Prior Publication Data

US 2001/0023584 A1 Sep. 27, 2001

(30) Foreign Application Priority Data

Feb. 24, 2000 (JP) ........................................ 2000-047938
Feb. 15, 2001 (JP) ........................................ 2001-038151

(51) Int. Cl.$^7$ ................................................ F01N 3/00
(52) U.S. Cl. ............................. 60/285; 60/274; 60/276; 60/301
(58) Field of Search .......................... 60/274, 276, 277, 60/285, 301

(56) References Cited

U.S. PATENT DOCUMENTS

| | | | |
|---|---|---|---|
| 5,839,274 A | * 11/1998 | Remboski et al. ............ | 60/277 |
| 5,842,340 A | 12/1998 | Bush et al. .................... | 60/274 |
| 5,901,552 A | 5/1999 | Schnaibel et al. ............. | 60/274 |
| 6,185,929 B1 | * 2/2001 | Ishizuka et al. ............... | 60/277 |
| 6,216,448 B1 | * 4/2001 | Schanaibel et al. ............ | 60/285 |
| 6,216,450 B1 | * 4/2001 | Takahashi et al. ............. | 60/276 |
| 6,220,018 B1 | * 4/2001 | Yamanashi et al. ............ | 60/285 |
| 6,230,487 B1 | * 5/2001 | Blumenstock et al. ......... | 60/286 |
| 6,324,834 B1 | * 12/2001 | Schnaibel et al. ............. | 60/286 |
| 6,336,320 B1 | * 1/2002 | Tanaka et al. ................. | 60/286 |

FOREIGN PATENT DOCUMENTS

JP 9-228873 9/1997

OTHER PUBLICATIONS

U.S. patent application Ser. No. 09/418,255, Tayama et al., filed Oct. 15, 1999.

* cited by examiner

Primary Examiner—Thomas Denion
Assistant Examiner—Diem Tran
(74) Attorney, Agent, or Firm—Foley & Lardner

(57) ABSTRACT

An oxygen storage amount of the catalyst (3) is estimated using a detection result from a front A/F sensor (4). An HC storage amount is calculated as a time integral of the product of the storage rate by the catalyst (3), the air-fuel ratio and the intake air amount, and a target air-fuel ratio is corrected so that a deficiency relative to a target amount of the oxygen storage amount is compensated based on this computation result.

14 Claims, 16 Drawing Sheets

ENGINE EXHAUST PURIFICATION DEVICE

FIELD OF THE INVENTION

The present invention relates to an engine exhaust purification device provided with a catalyst.

BACKGROUND OF THE INVENTION

JP-A-H9-228873 published by the Japanese Patent Office in 1997 discloses a technique wherein an oxygen amount stored in a three-way catalyst (hereafter, "oxygen storage amount") is estimated based on an engine intake air amount and an air fuel ratio of an exhaust flowing into the catalyst, and engine air-fuel ratio control is performed so that the oxygen storage amount of the catalyst is constant.

To maintain the NOx (nitrogen oxides), CO and HC (hydrocarbon) conversion efficiency of the three-way catalyst at a maximum, the catalyst atmosphere must be maintained at the stoichiometric air-fuel ratio. If the oxygen storage amount of the catalyst is maintained constant, oxygen in the exhaust is stored in the catalyst even if the air-fuel ratio of the exhaust flowing into the catalyst temporarily becomes lean, and conversely, oxygen stored in the catalyst is released even if the air-fuel ratio of the exhaust flowing into the catalyst temporarily becomes rich, so the catalyst atmosphere can be maintained at the stoichiometric air-fuel ratio.

Therefore, in an exhaust purification device performing this type of control, it is required to calculate the oxygen storage amount precisely to maintain the conversion efficiency of the catalyst at a high level, and various methods of computing the oxygen storage amount have been proposed.

SUMMARY OF THE INVENTION

However, non-oxygen components such as HC, CO are stored by the catalyst apart from oxygen, and an error occurs in the real oxygen storage amount due to their influence. In the prior art, the reason for this error was not considered, so there was a risk of decreasing the precision of air-fuel ratio control of the catalyst atmosphere and impairing exhaust emissions.

It is therefore an object of this invention to resolve the above problems, and to provide an exhaust purification device for an engine which eliminates the effect of non-oxygen components and permits precise control of the oxygen storage amount.

In order to achieve above object, this invention provides an engine exhaust purification device which comprises a catalyst provided in an engine exhaust passage, a first sensor which detects an exhaust characteristic flowing into the catalyst, a second sensor which detects an exhaust characteristic flowing out of the catalyst, and a microprocessor programmed to compute an oxygen storage amount of the catalyst using the detected exhaust characteristic, to compute the storage amount of a non-oxygen component of the catalyst, to compute the air fuel ratio of the engine so that the oxygen storage amount of the catalyst is a target amount based on the computed oxygen storage amount, and to control the computed air fuel ratio based on the computed non-oxygen component storage amount.

DESCRIPTION OF THE PREFERRED EMBODIMENTS

Figure 1:
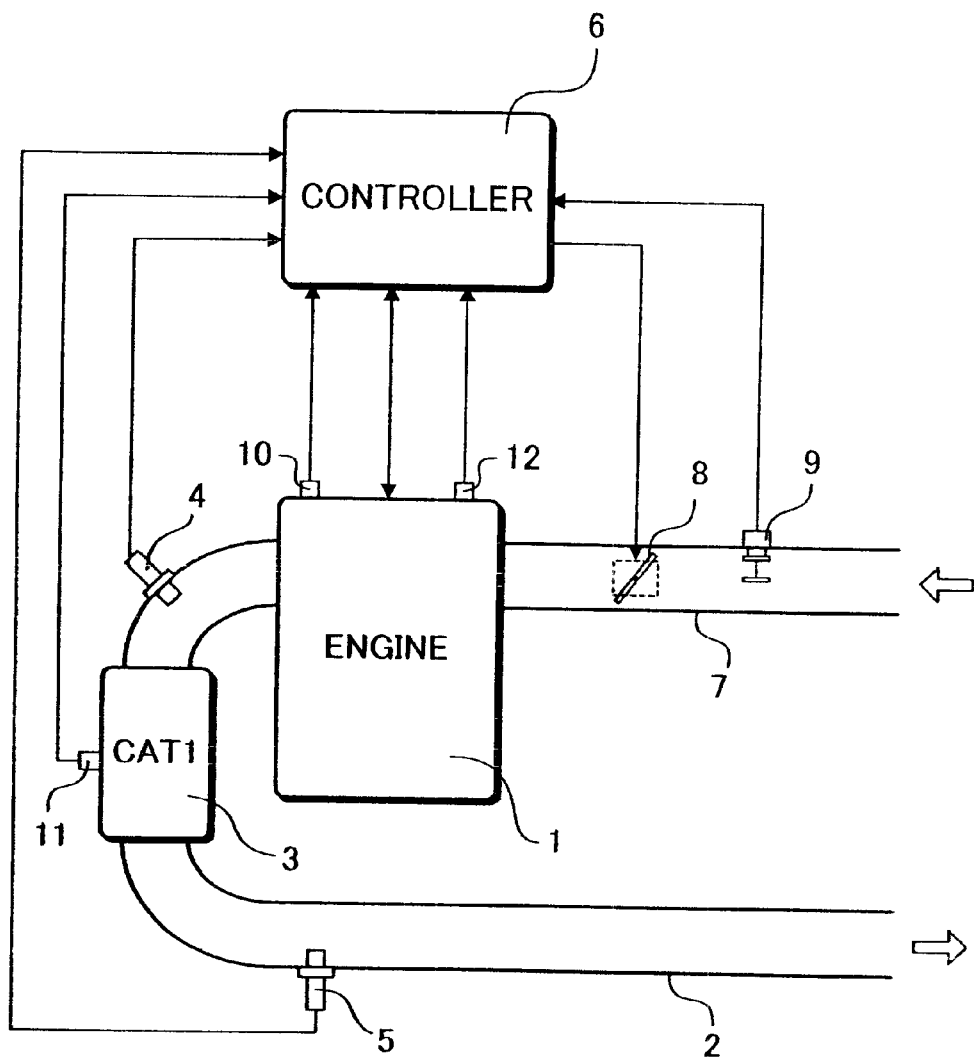
FIG. 1 is a schematic diagram of an exhaust purification device according to this invention.

Referring to FIG. 1 of the drawings, an exhaust passage 2 of an engine 1 is provided with a catalyst 3, front wide range air-fuel ratio sensor 4 (hereafter referred to as front A/F sensor), a rear oxygen sensor 5 and controller 6.

A throttle 8, and an air flow meter 9 which detects the intake air amount adjusted by the throttle 8, are provided in an intake passage 7 of the engine 1. In addition, a crank angle sensor 12 which detects the engine rotation speed of the engine 1 is provided.

The catalyst 3 is a catalyst having a three-way catalyst function. The catalyst 3 purifies NOx, HC and CO with maximum efficiency when the catalyst atmosphere is at the stoichiometric air-fuel ratio. The catalyst carrier of the catalyst 3 is coated with an oxygen storage material such as cerium oxide, and the catalyst 3 has the function of storing or releasing oxygen according to the air-fuel ratio of the inflowing exhaust (referred to hereafter as oxygen storage function).

Here, the oxygen storage amount of the catalyst 3 may be partitioned into a high speed component HO2 which is stored and released by a noble metal in the catalyst 3 (Pt, Rh, Pd), and a low speed component LO2 which is stored and released by the oxygen storage material in the catalyst 3. The low speed component LO2 represents the storage and release of a larger amount of oxygen than the high speed component HO2, but its storage/release rate is slower than that of the high speed component HO2.

Further, this high speed component HO2 and low speed component LO2 have characteristics as follows:

When oxygen is stored, oxygen is stored preferentially as the high speed component HO2, and begins to be stored as the low speed component LO2 when the high speed component HO2 has reached a maximum capacity HO2MAX and can no longer be stored.

When oxygen is released, and the ratio of the low speed component LO2 to the high speed component HO2 (LO2/HO2) is less than a predetermined value, i.e. when the high speed component is relatively large, oxygen is preferentially released from the high speed component HO2, and when the ratio of the low speed component LO2 to the high speed component HO2 is larger than the predetermined value, oxygen is released from both the high speed component HO2 and low speed component LO2 so that the ratio of the low speed component LO2 to the high speed component HO2 does not vary.

Figure 2:
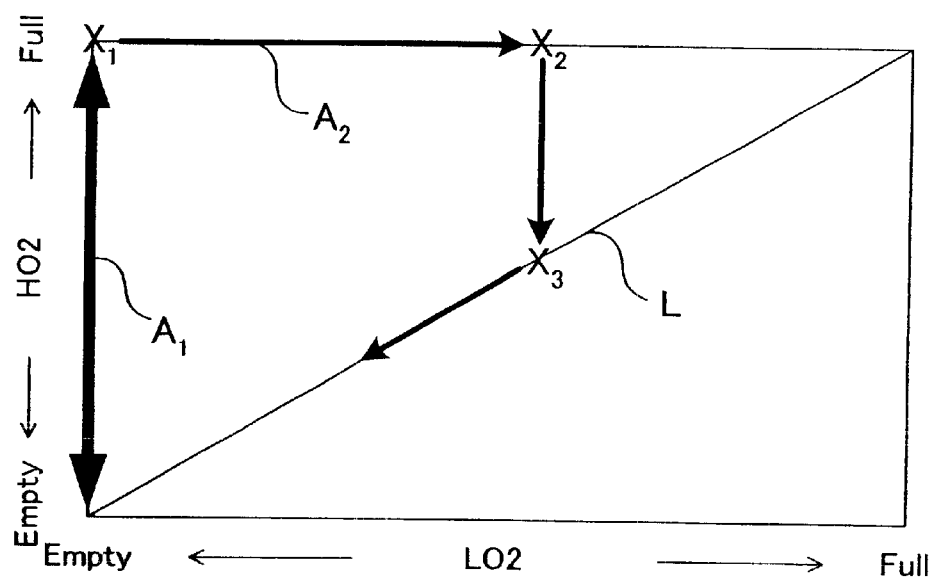
FIG. 2 is a diagram showing the oxygen release characteristics of a catalyst.

FIG. 2 shows the experimental results for these characteristics. The vertical axis shows released amount from the high speed component HO2, and the horizontal axis shows released amount from the low speed component LO2. If three different amounts are experimentally released from effectively the same release start points ($X_1$, $X_2$, $X_3$), the release finish points are $X_1'$, $X_2'$, $X_3'$ and the ratio of low speed component to high speed component is constant when release is complete.

As a result, it appears that when oxygen release begins, the oxygen is released from the high speed component so that the high speed component decreases, and when the ratio of low speed component to high speed component reaches a predetermined ratio, this ratio is subsequently maintained, i.e., oxygen is released while moving on a straight line L shown in the Figure. Here, the low speed component is from 5 to 15, and preferably approximately 10, relative to the high speed component 1. The same characteristics are obtained even when the release start point lies in the region below the line L.

When the release start point is in the region to the left of the line L (Y in the Figure), oxygen is released effectively along the straight line connecting the start point and finish point Y'.

Returning to FIG. 1, the front A/F sensor 4 provided upstream of the catalyst 3 outputs a voltage according to the air-fuel ratio of the exhaust flowing into the catalyst 3. The rear oxygen sensor 5 provided downstream of the catalyst 3 detects whether the exhaust air-fuel ratio downstream of the catalyst 3 is rich or lean with the stoichiometric air-fuel ratio as a threshold value. Here, an economical oxygen sensor was provided downstream of the catalyst 3, but an A/F sensor which can detect the air fuel ratio continuously can be provided instead.

The cooling water temperature sensor 10 which detects the temperature of the cooling water is fitted to the engine 1. The detected cooling water temperature is used for determining the running state of the engine 1, and also for estimating the catalyst temperature of the catalyst 3.

The controller 6 comprises a microprocessor, RAM, ROM and I/O interface, and it computes the oxygen storage amount of the catalyst 3 (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount (e.g., half the maximum capacity HO2MAX of the high speed component), the controller 6 makes the air fuel ratio of the engine 1 rich, makes the air-fuel ratio of the exhaust flowing into the catalyst 3 rich, and decreases the high speed component HO2. Conversely, when it is less than the predetermined amount, the controller 6 makes the air fuel ratio of the engine 1 lean, makes the air-fuel ratio of the exhaust flowing into the catalyst 3 lean, increases the high speed component HO2, and maintains the high speed component HO2 of the oxygen storage amount constant.

A discrepancy may arise between the computed oxygen storage amount and real oxygen storage amount due to computational error, so the controller 6 resets the computational value of the oxygen storage amount with a predetermined timing based on the air-fuel ratio of the exhaust downstream of the catalyst 3, and corrects this discrepancy from the real oxygen storage amount.

Specifically, when it is determined that the air-fuel ratio downstream of the catalyst 3 is lean based on the output of the rear oxygen sensor 5, it is determined that at least the high speed component HO2 is maximum, and the high speed component HO2 is reset to maximum capacity. When it is determined by the rear oxygen sensor 5 that the air fuel ratio downstream of the catalyst 3 is rich, oxygen is no longer being released not only from the high speed component HO2 but also from the low speed component LO2, so the high speed component HO2 and high speed component LO2 are reset to minimum capacity.

Next, the control performed by the controller 6 will be described.

First, the computation of the oxygen storage amount will be described, followed by resetting of the computational value of the oxygen storage amount, and air-fuel ratio control of the engine 1 based on the oxygen storage amount.

Figure 3:
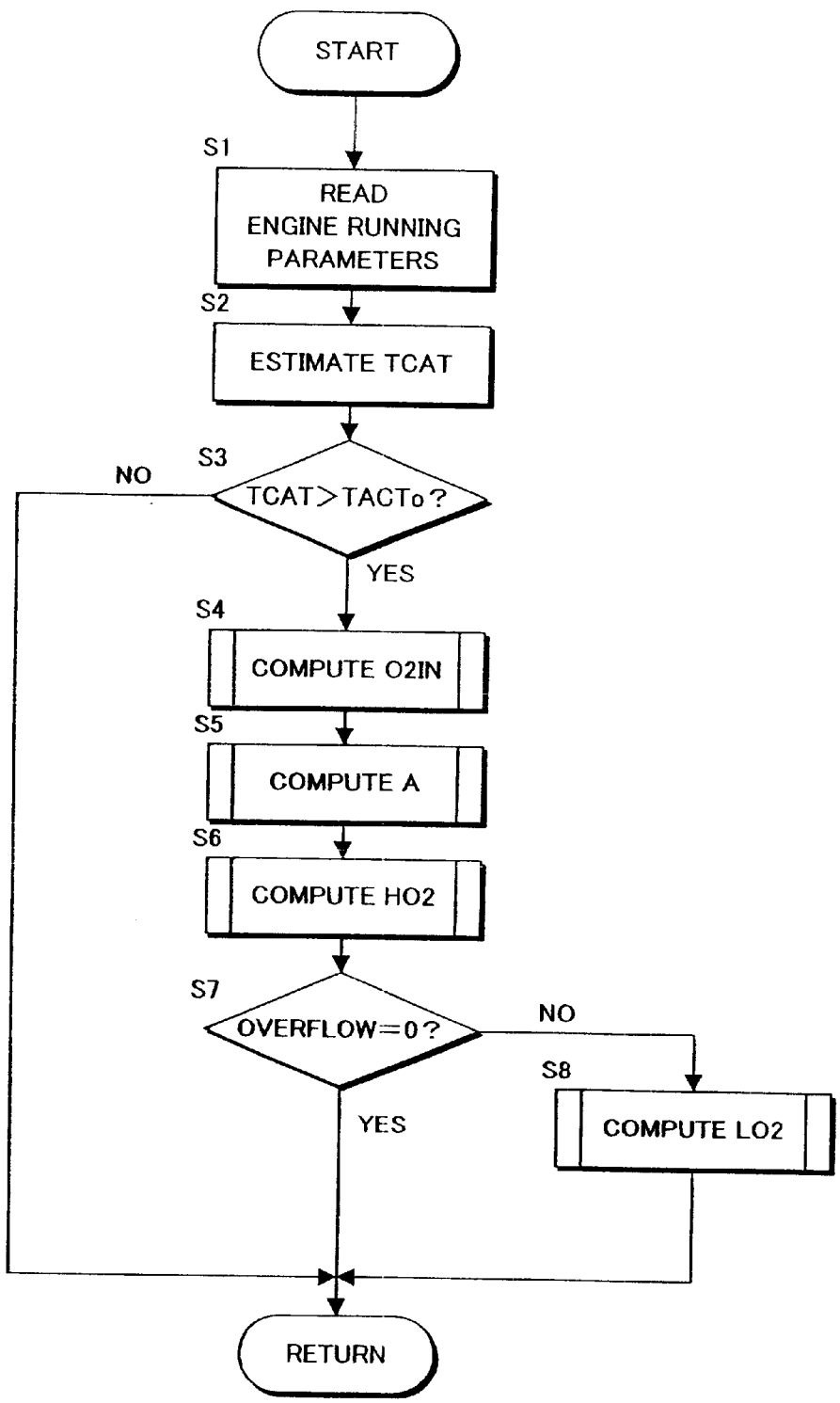
FIG. 3 is a flowchart showing a routine for computing an oxygen storage amount of the catalyst.

According to the routine as shown by FIG. 3, first, in a step S1, the outputs of the cooling water temperature sensor 10, crank angle sensor 12 and air flow meter 9 are read as running parameters of the engine 1. In a step S2, a temperature TCAT of the catalyst 3 is estimated based on these parameters. In a step S3, by comparing the estimated catalyst temperature TCAT and a catalyst activation temperature TACTo (e.g. 300° C.), it is determined whether or not the catalyst 3 has activated.

When it is determined that the catalyst activation temperature TACTo has been reached, the routine proceeds to a step S4 to compute the oxygen storage amount of the catalyst 3. When it is determined that the catalyst activation temperature TACTo has not been reached, processing is terminated assuming that the catalyst 3 does not store or release oxygen.

In the step S4, a subroutine (FIG. 4) for computing an oxygen excess/deficiency amount O2IN is performed, and the oxygen excess/deficiency amount of the exhaust flowing into the catalyst 3 is computed. In a step S5, a subroutine (FIG. 5) for computing an oxygen release rate A of the high speed component of the oxygen storage amount is performed, and the oxygen release rate A of the high speed component is computed.

Further, in a step S6, a subroutine (FIG. 6) for computing the high speed component HO2 of the oxygen storage amount is performed, and the high speed component HO2 and an oxygen amount OVERFLOW overflowing into the low speed component LO2 without being stored as the high speed component HO2, are computed based on the oxygen excess/deficiency amount O2IN and the oxygen release rate A of the high speed component.

In a step S7, it is determined whether or not all of the oxygen excess/deficiency amount O2IN flowing into the catalyst 3 has been stored as the high speed component HO2 based on the overflow oxygen amount OVERFLOW. When all of the oxygen excess/deficiency amount O2IN has been stored as the high speed component (OVERFLOW=0), processing is terminated. In other cases, the routine proceeds to a step S8, a subroutine (FIG. 7) is performed for computing the low speed component LO2, and the low speed component LO2 is computed based on the overflow oxygen amount OVERFLOW overflowing from the high speed component HO2.

Here, the catalyst temperature TCAT is estimated from the cooling water temperature of the engine 1, the engine load and the engine rotation speed, but a temperature sensor 11 may also be attached to the catalyst 3 as shown in FIG. 1 and the temperature of the catalyst 3 measured directly.

When the catalyst temperature TCAT is less than the activation temperature TACTo, the oxygen storage amount is not computed, but the step S3 may be eliminated, and the effect of the catalyst temperature TCAT may be reflected in the oxygen release rate A of the high speed component or an oxygen storage/release rate B of the low speed component, described later.

Next, a subroutine performed from steps S4 to S6 and in the step S8 will be described.

Figure 4:
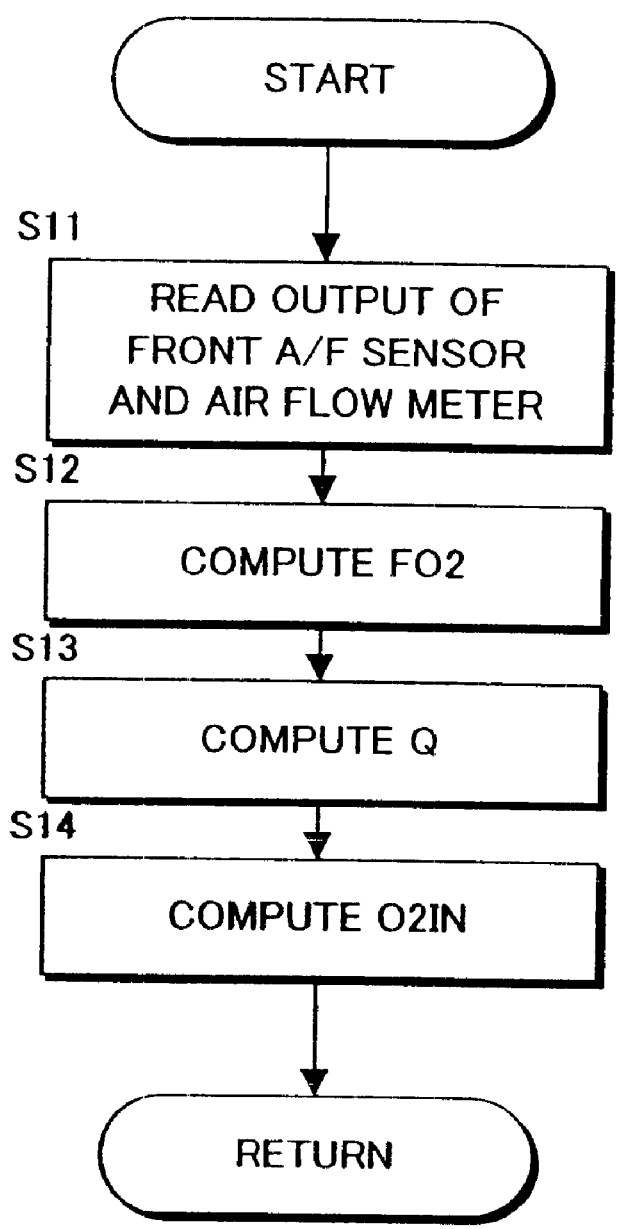
FIG. 4 is a flowchart showing a subroutine for computing an oxygen excess/deficiency amount in exhaust flowing into the catalyst.

FIG. 4 shows the subroutine for computing the oxygen excess/deficiency amount O2IN of the exhaust flowing into the catalyst 3. In this subroutine, the oxygen excess/deficiency amount O2IN of the exhaust flowing into the catalyst 3 is computed based on the air-fuel ratio of the exhaust upstream of the catalyst 3 and the intake air amount of the engine 1.

First, in a step S11, the output of the front A/F sensor 4 and the output of the air flow meter 9 are read.

Next, in a step S12, the output of the front A/F sensor 4 is converted to an excess/deficiency oxygen concentration FO2 of the exhaust flowing into the catalyst 3 using a predetermined conversion table. Here, the excess/deficiency oxygen concentration FO2 is a relative concentration based on the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S13, the output of the air flow meter 9 is converted to an intake air amount Q using a predetermined conversion table, and in a step S14, the intake air amount Q is multiplied by the excess/deficiency oxygen concentration FO2 to compute the excess/deficiency oxygen a mount O2IN of the exhaust flowing into the catalyst 3.

As the excess/deficiency oxygen concentration FO2 has the above characteristics, the excess/deficiency oxygen amount O2IN is zero when the exhaust flowing into the catalyst 3 is at the stoichiometric air-fuel ratio, a negative value when it is rich, and a positive value when it is lean.

Figure 5:
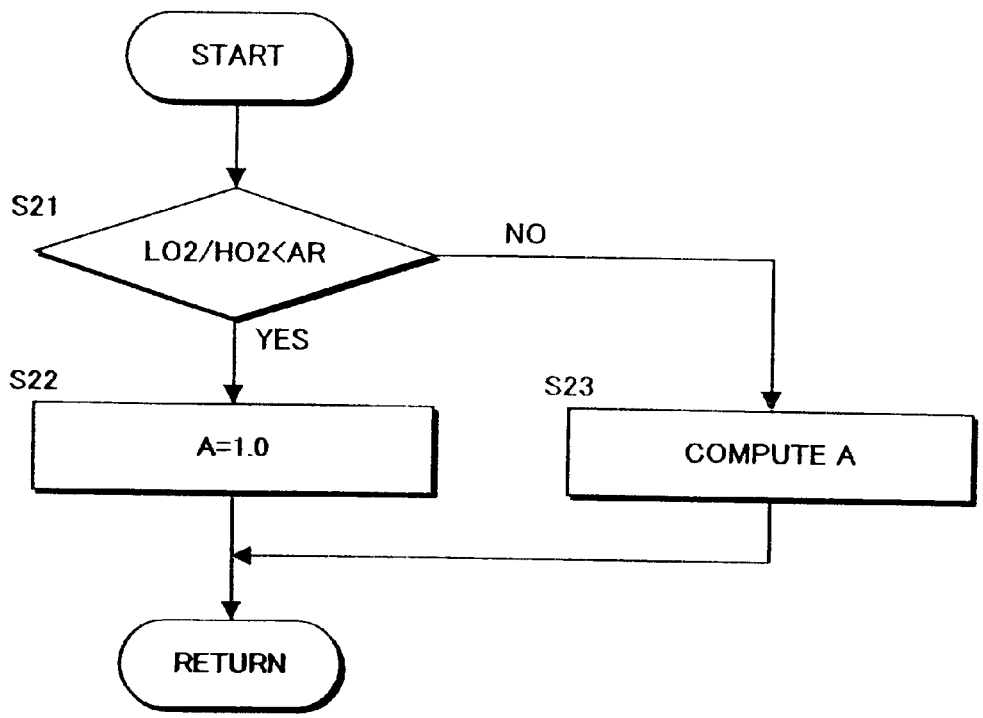
FIG. 5 is a flowchart showing a subroutine for computing an oxygen release rate of a high speed component.

FIG. 5 shows a subroutine for computing the oxygen release rate A of the high speed component of the oxygen storage amount. In this subroutine, as the oxygen release rate of the high speed component HO2 is affected by the low speed component LO2, the oxygen release rate A of the high speed component is computed according to the low speed component LO2.

First, in a step S21, it is determined whether or not a ratio LO2/HO2 of low speed component relative to the high speed component is less than a predetermined value AR (e.g. AR=10). When it is determined that the ratio LO2/HO2 is less than the predetermined value AR, i.e., when the high speed component HO2 is relatively larger than the low speed component LO2, the routine proceeds to a step S22, and the oxygen release rate A of the high speed component is set to 1.0 expressing the fact that oxygen is released first from the high speed component HO2.

On the other hand, when it is determined that the ratio LO2/HO2 is not less than the predetermined value AR, oxygen is released from the high speed component HO2 and the low speed component LO2 so that the ratio of the low speed component LO2 to the high speed component HO2 does not vary. The routine then proceeds to a step S23, and a value of the oxygen release rate A of the high speed component is computed which does not cause the ratio LO2/HO2 to vary.

Figure 6:
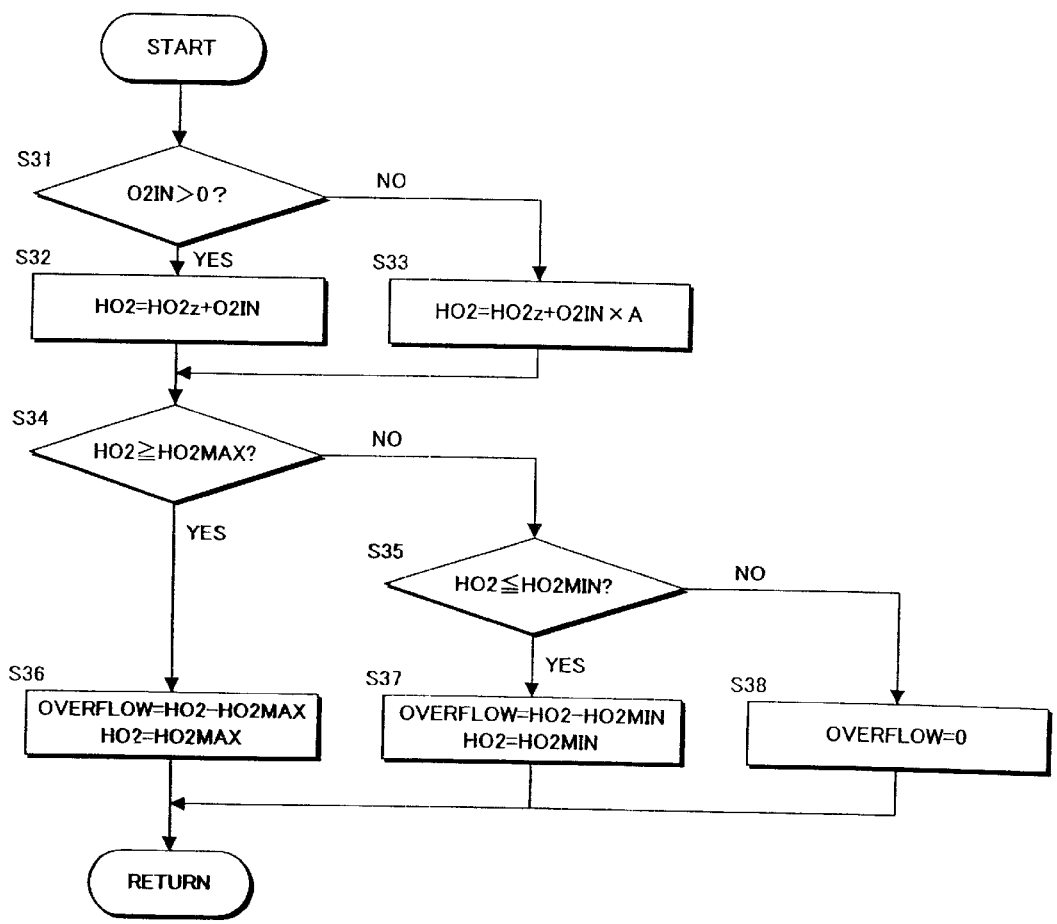
FIG. 6 is a flowchart showing a subroutine for computing the high speed component of the oxygen storage amount.

FIG. 6 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in a step S31 whether or not the high speed component HO2 is being stored or released based on the oxygen excess/deficiency amount O2IN.

When the air-fuel ratio of the exhaust flowing into the catalyst 3 is lean and the oxygen excess/deficiency amount O2IN is larger than zero, it is determined that the high speed component HO2 is being stored, the routine proceeds to a step S32, and the high speed component HO2 is computed from the following equation (1):

$$HO2 = HO2z + O2IN \quad (1)$$

where:

HO2z: value of high speed component HO2 on immediately preceding occasion.

On the other hand, when it is determined that the oxygen excess/deficiency amount O2IN is less than zero and the high speed component is being released, the routine proceeds to a step S33, and the high speed component HO2 is computed from the following equation (2):

$$HO2 = HO2z - O2IN \times A \quad (2)$$

where:

A: oxygen release rate of high speed component HO2.

In steps S34, S35, it is determined whether or not the computed HO2 exceeds the maximum capacity HO2MAX of the high speed component, or whether it is not less than a minimum capacity HO2MIN (=0).

When the high speed component HO2 is greater than the maximum capacity HO2MAX, the routine proceeds to a step S36, the overflow oxygen amount (excess amount) OVERFLOW flowing out without being stored as the high speed component HO2 is computed from the following equation (3):

$$OVERFLOW = HO2 - HO2MAX \quad (3),$$

and the high speed component HO2 is limited to the maximum capacity HO2MAX.

When the high speed component HO2 is less than the minimum capacity HO2MIN, the routine proceeds to a step S37, the overflow oxygen amount (deficiency amount) OVERFLOW which was not stored as the high speed component HO2 is computed by the following equation (4):

$$OVERFLOW = HO2 - HO2MIN \quad (4),$$

and the high speed component HO2 is limited to the minimum capacity HO2MIN. Here, zero is given as the minimum capacity HO2MIN, so the oxygen amount which is deficient when all the high speed component HO2 has been released is computed as a negative overflow oxygen amount.

When the high speed component HO2 lies between the maximum capacity HO2MAX and minimum capacity HO2MIN, the oxygen excess/deficiency amount O2IN of the exhaust flowing into the catalyst 3 is all stored as the high speed component HO2, and zero is set to the overflow oxygen amount OVERFLOW.

Here, when the high speed component HO2 is greater than the maximum capacity HO2MAX or less than the minimum capacity HO2MIN, the overflow oxygen amount OVER-FLOW which has overflowed from the high speed component HO2 is stored as the low speed component LO2.

Figure 7:
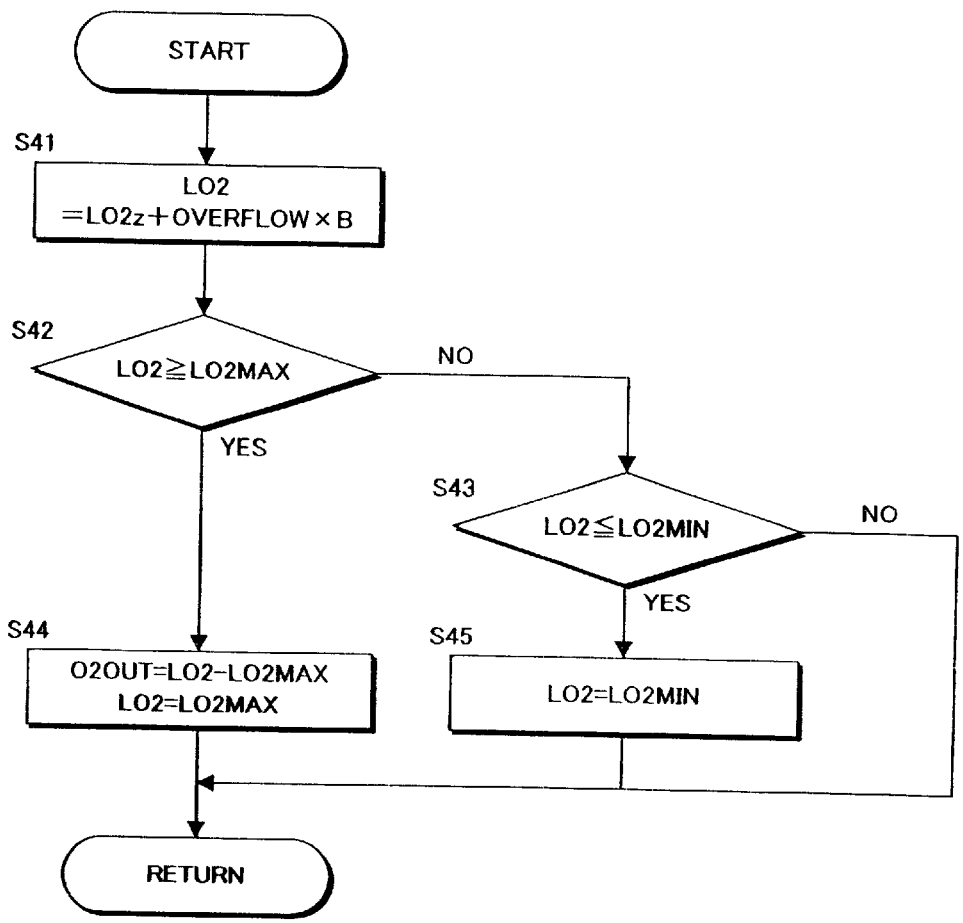
FIG. 7 is a flowchart showing a subroutine for computing a low speed component of the oxygen storage amount.

FIG. 7 shows a subroutine for computing the low speed component LO2 of the oxygen storage amount. In this subroutine, the low speed component LO2 is computed based on the overflow oxygen amount OVERFLOW which has overflowed from the high speed component HO2.

According to this, in a step S41, the low speed component LO2 is computed by the following equation (5):

$$LO2=LO2z+OVERFLOW\times B \quad (5)$$

where:

LO2z: immediately preceding value of low speed component LO2, and B: oxygen storage/release rate of low speed component.

Here, the oxygen storage/release rate B of the low speed component is set to a positive value less than 1, but actually has different characteristics for storage and release. Further, the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set to for example a value which is larger the higher the catalyst temperature TCAT or the smaller the low speed component LO2. Also, when the overflow oxygen amount OVERFLOW is negative, oxygen is deficient, and the oxygen release rate at this time may for example be set to a value which is larger the higher the catalyst temperature TCAT or the larger the low speed component LO2.

In steps S42, S43, in the same way as when the high speed component HO2 is computed, it is determined whether or not the computed low speed component LO2 has exceeded a maximum capacity LO2MAX or is less than a minimum capacity LO2MIN (=0).

When maximum capacity LO2MAX is exceeded, the routine proceeds to a step S44, an oxygen excess/deficiency amount O2OUT which has overflowed from the low speed component LO2 is computed from the following equation (6):

$$LO2OUT=LO2-LO2MAX \quad (6)$$

and the low speed component LO2 is limited to the maximum capacity LO2MAX. The oxygen excess/deficiency amount O2OUT flows out downstream of the catalyst 3.

When the low speed component LO2 is less than the minimum capacity, the routine proceeds to a step S45, and the low speed component LO2 is limited to the minimum capacity LO2MIN.

Next, the resetting of the computed value of the oxygen storage amount performed by the controller 6 will be described. By resetting the computed value of the oxygen storage amount under predetermined conditions, computational errors which have accumulated so far are eliminated, and the computational precision of the oxygen storage amount can be improved.

Figure 8:
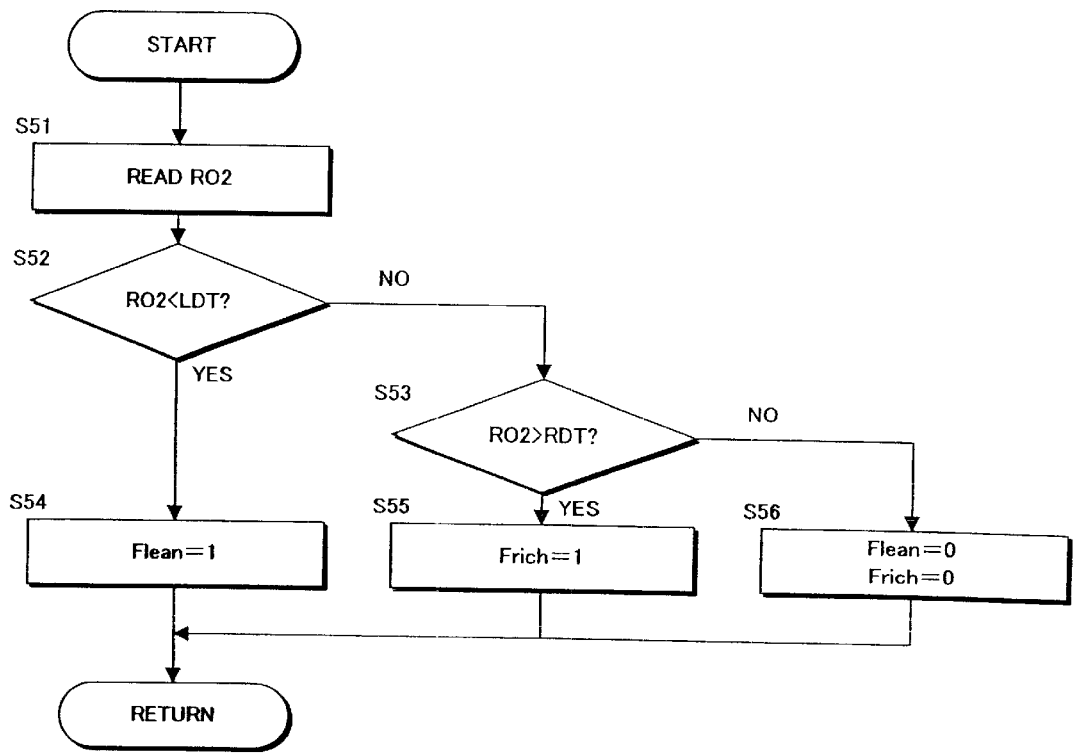
FIG. 8 is a flowchart showing a routine for determining a reset condition.

FIG. 8 shows the details of a routine for determining the reset condition. This routine determines whether or not a condition for resetting the oxygen storage amount (high speed component HO2 and low speed component LO2) holds from the exhaust air-fuel ratio downstream of the catalyst 3, and sets a flag Frich and a flag Flean.

First, in a step S51, the output of the rear oxygen sensor 5 which detects the exhaust air-fuel ratio downstream of the catalyst 3 is read. Subsequently, in a step S52, the rear oxygen sensor output RO2 is compared with a lean determining threshold LDT, and in a step S53, the rear oxygen sensor output RO2 is compared with the rich determining threshold RDT.

As a result of these comparisons, when the rear oxygen sensor output RO2 is less than the lean determining threshold LDT, the routine proceeds to a step S54, and the flag Flean is set to "1" showing that the lean reset condition for the oxygen storage amount holds.

When the rear oxygen sensor output RO2 exceeds the rich determining threshold RDT, the routine proceeds to a step S55, and the flag Frich is set to "1" showing that the rich reset condition for the oxygen storage amount holds.

When the rear oxygen sensor output RO2 lies between the lean determining threshold LDT and rich determining threshold RDT, the routine proceeds to a step S56, and the flags Flean and Frich are set to "0" showing that the lean reset condition and rich reset condition do not hold.

Figure 9:
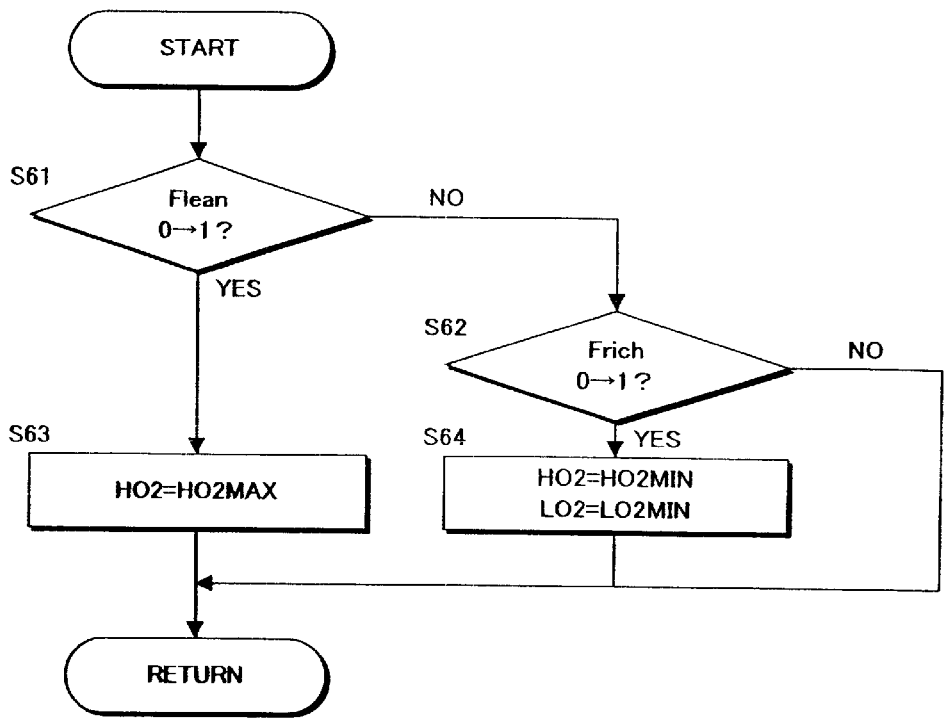
FIG. 9 is a flowchart showing a routine for performing reset of the computed oxygen storage amount.

FIG. 9 shows a routine for resetting the oxygen storage amount.

According to this, in steps S61, S62, it is determined whether or not the lean reset conditions or rich reset conditions hold based on the variation of the values of the flags Flean and Frich.

When the flag Flean changes from "0" to "1", and it is determined that lean reset conditions hold, the routine proceeds to a step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to a step S64, and the high speed component HO2 and low speed component LO2 of the oxygen storage amount are respectively reset to the minimum capacities HO2MIN, LO2MIN.

The reason why resetting is performed under these conditions is that as the oxygen storage rate of the low speed component LO2 is slow, oxygen overflows downstream of the catalyst even if the low speed component LO2 has not reached maximum capacity when the high speed component HO2 reaches maximum capacity, and when the exhaust air-fuel ratio downstream of the catalyst becomes lean, it may be considered that at least the high speed component HO2 has reached maximum capacity.

When the exhaust air fuel ratio downstream of the catalyst becomes rich, oxygen is not released from the low speed component LO2 which is released slowly. Therefore, it may be considered that the high speed component HO2 and low speed component LO2 are both not being stored and are at minimum capacity.

Next, the air-fuel ratio control performed by the controller 6 (oxygen storage amount constant control) will be described.

Figure 10:
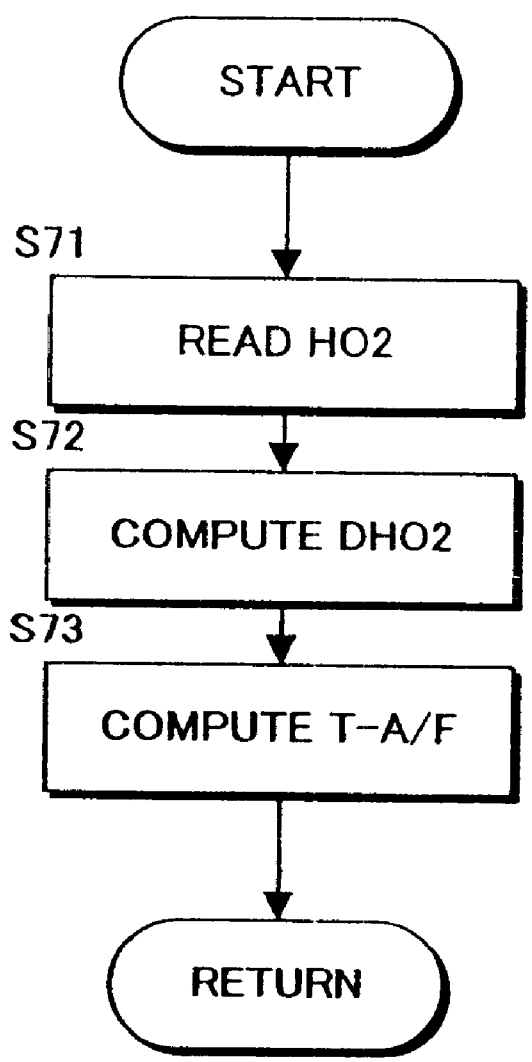
FIG. 10 is a flowchart showing a routine for computing a target air fuel ratio based on the oxygen storage amount.

FIG. 10 shows a routine for computing a target air fuel ratio based on the oxygen storage amount.

According to this, in a step S71, the high speed component HO2 of the present oxygen storage amount is read. In a step S72, a deviation DHO2 (=oxygen excess/deficiency amount required by catalyst 3) between the current high speed component HO2 and a target value TGHO2 of the high speed component, is computed. The target value TGHO2 of the high speed component is set to, for example, half of the maximum capacity HO2MAX of the high speed component. In a step S73, the computed deviation DHO2 is converted to an air-fuel ratio equivalent value, and a target air-fuel ratio T–A/F of the engine 1 is set.

Therefore, according to this routine, when the high speed component HO2 of the oxygen storage amount does not reach a target amount, the target air fuel ratio of the engine 1 is set to lean, and the oxygen storage amount (high speed component HO2) is increased. On the other hand, when the high speed component HO2 exceeds the target amount, the target air fuel ratio of the engine 1 is set to rich, and the oxygen storage amount (high speed component HO2) is decreased.

Next, the overall action performed by the above control will be described.

In the exhaust purification device according to this invention, when the engine 1 starts, computation of the oxygen storage amount of the catalyst 3 begins, and air fuel ratio control of the engine 1 is performed so that the oxygen storage amount of the catalyst 3 is constant to maintain the conversion efficiency of the catalyst 3 at a maximum.

The oxygen storage amount of the catalyst 3 is estimated based on the air-fuel ratio of the exhaust gas flowing into the catalyst 3 and the intake air amount, and computation of the oxygen storage amount is divided into the high speed component HO2 and low speed component LO2 according to the actual characteristics.

Specifically, the computation is performed assuming that when oxygen is stored, the high speed component HO2 is preferentially stored, and the low speed component LO2 begins to be stored when the high speed component HO2 can no longer be stored. The computation also assumes that when oxygen is released, when the ratio (LO2/HO2) of the low speed component LO2 and high speed component HO2 is less than the predetermined value AR, oxygen is preferentially released from the high speed component HO2, and when the ratio LO2/HO2 reaches the predetermined value AR, oxygen is released from both the low speed component LO2 and high speed component HO2 to maintain this ratio LO2/HO2.

When the high speed component HO2 of the computed oxygen storage amount is larger than the target value, the controller 6 decreases the high speed component by controlling the air-fuel ratio of the engine 1 to rich, and when it is less than the target value, the high speed component HO2 is increased by controlling the air-fuel ratio to lean.

As a result, the high speed component HO2 of the oxygen storage amount is maintained at the target value, and even if the air-fuel ratio of the exhaust flowing into the catalyst 3 shifts from the stoichiometric air-fuel ratio, oxygen is immediately stored as the high speed component HO2 or immediately released as the high speed component Ho2 which has a high responsiveness, the catalyst atmosphere is corrected to the stoichiometric air-fuel ratio, and the conversion efficiency of the catalyst 3 is maintained at a maximum.

Further, if computational errors accumulate, the computed oxygen storage amount shifts from the real oxygen storage amount, however the oxygen storage amount (high speed component HO2 and low speed component LO2) is reset with a timing at which the exhaust downstream of the catalyst 3 becomes rich or lean, and any discrepancy between the computed value and real oxygen storage amount is corrected.

Figure 11:
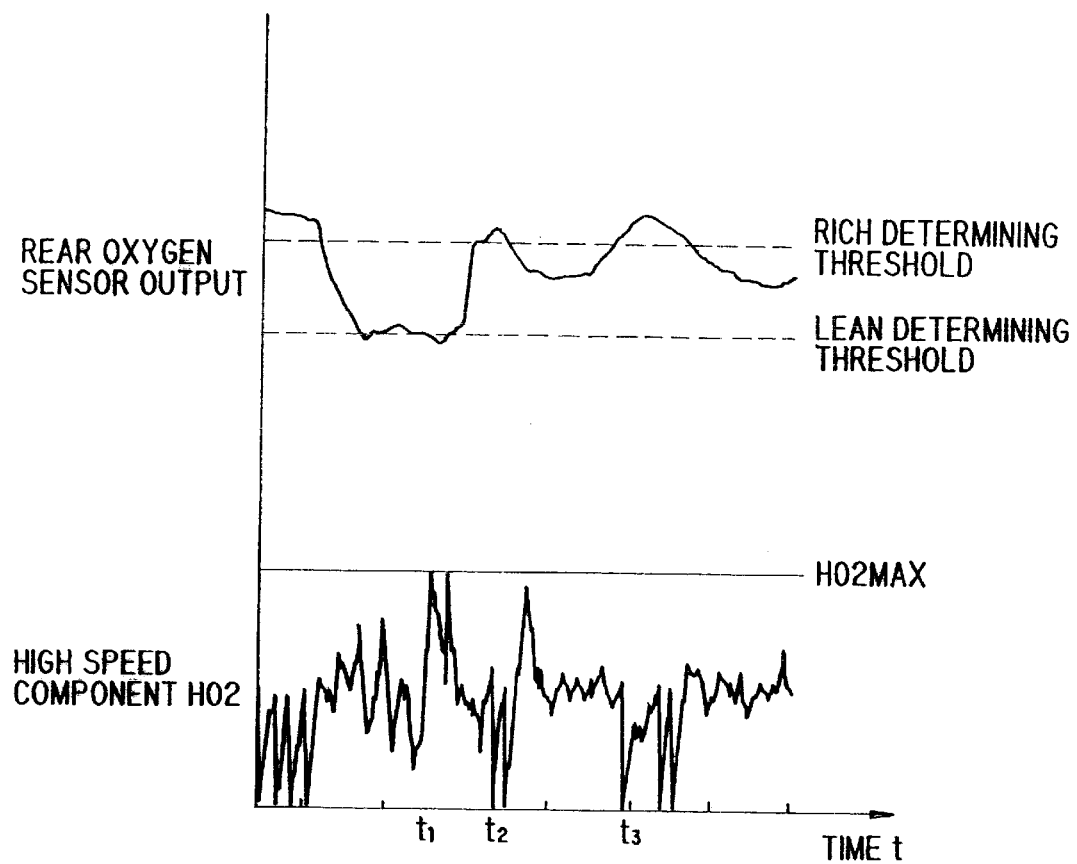
FIG. 11 is a diagram showing how a rear oxygen sensor output and high speed component vary when the oxygen storage amount is controlled to be constant.

FIG. 11 shows how the high speed component HO2 varies when the above oxygen storage amount constant control is performed.

In this case, at the time t1, the output of the rear oxygen sensor 5 becomes less than the lean determining threshold and lean reset conditions hold, so the high speed component HO2 is reset to the maximum capacity HO2MAX. However, the low speed component LO2 is not necessarily a maximum at this time, so reset of the low speed component is not performed, not shown.

At times t2, t3, the output of the rear oxygen sensor 5 becomes greater than the rich determining threshold and rich reset conditions hold, so the high speed component HO2 of the oxygen storage amount is reset to the minimum capacity (=0). The low speed component LO2 at this time is also reset to the minimum capacity, not shown.

Thus, resetting of the computed values of the oxygen storage amount is performed with a timing at which the air-fuel ratio of the exhaust downstream of the catalyst 3 becomes rich or lean, and as a result of the discrepancy from the real oxygen storage amount being corrected, the computational precision of the oxygen storage amount of the catalyst is further enhanced, the precision of air-fuel ratio control for maintaining the oxygen storage amount constant is increased, and the conversion efficiency of the catalyst is maintained at a high level.

Figure 12:
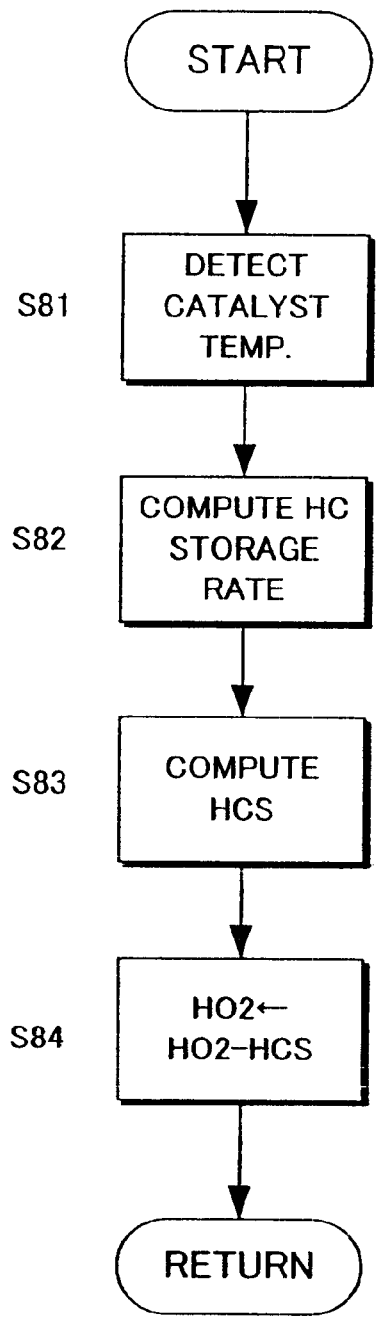
FIG. 12 is a flowchart showing the details of the first embodiment of a correction routine according to an HC storage amount.
Figure 13:
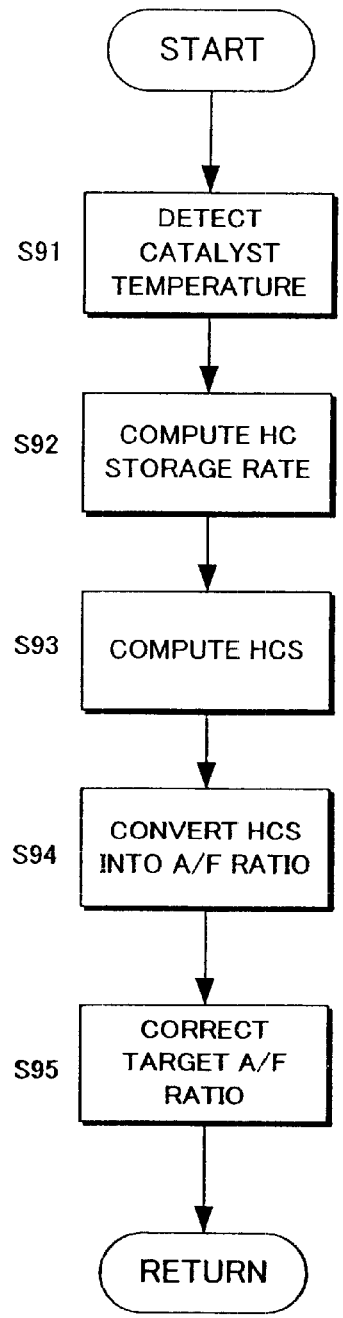
FIG. 13 is similar to FIG. 12, but showing a flowchart showing the details of a second embodiment of a correction routine according to an HC storage amount.
Figure 14:
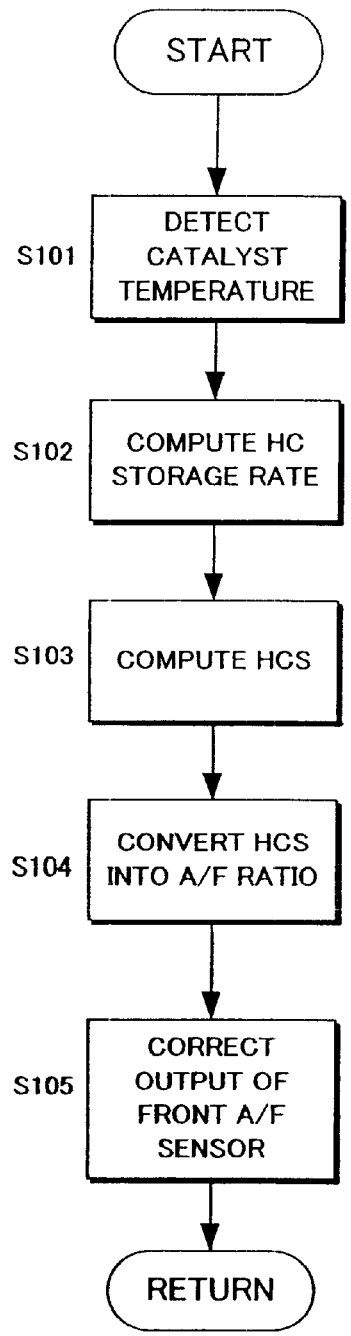
FIG. 14 is similar to FIG. 12, but showing a flowchart showing the details of a third embodiment of a correction routine according to an HC storage amount.

The above is an example of the air-fuel ratio control proposed by this invention. According to this invention, a storage amount of non-oxygen components by the catalyst is calculated to find the real oxygen storage amount more precisely. Hereafter, this point will be described referring to FIG. 12 and subsequent drawings. FIGS. 12, 13, 14 respectively show an embodiment of a routine for calculating the storage amount of HC which is a non-oxygen component, and controlling the air-fuel ratio from this result so that the oxygen storage amount is appropriate. This routine is performed periodically in synchronism with the air-fuel ratio control routine shown in FIG. 10.

Figure 15:
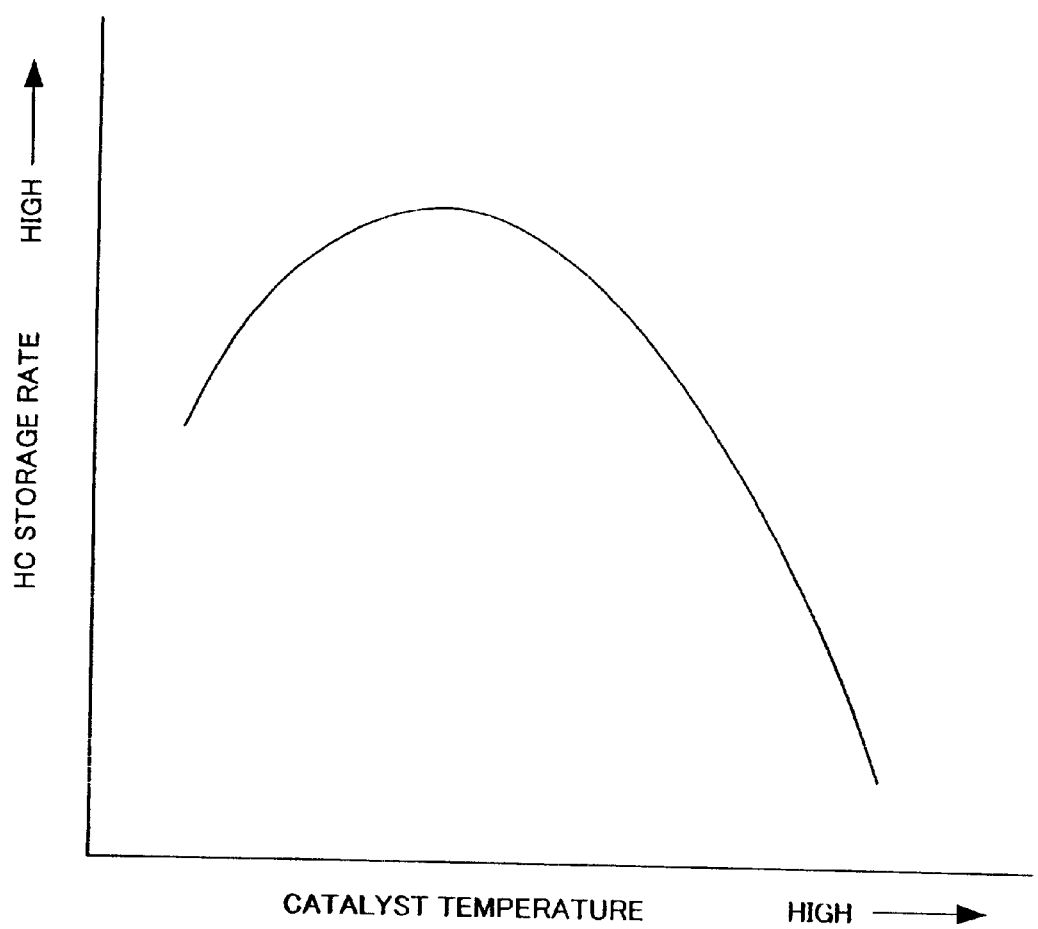
FIG. 15 is a characteristic diagram showing the relation between a catalyst temperature and an HC storage rate.

FIG. 12 is a first embodiment of the above routine. This has a function for directly correcting an estimated value of the oxygen storage amount based on the computed HC storage amount. Specifically, in this routine, a temperature of a catalyst 3 is first detected in a step S81. This may be done by directly detecting a signal from a catalyst temperature sensor 11, or by estimating the temperature using the engine cooling water temperature. Next, the HC adsorption rate is computed based on the detected catalyst temperature in a step S82. The HC storage rate (or storage amount) has the characteristic of generally decreasing the more the temperature rises in the catalyst activation temperature region, as shown in FIG. 15. Here, the HC storage rate is found for example by looking up a table which is preset so as to give the storage rate for each catalyst temperature according to this characteristic.

Next, a HC storage amount HCS in the catalyst 3 is computed using the above HC storage rate in a step S83. Any computational method may be used for this, for example it may be calculated by integrating the intake air amount detected via the air flow meter 9, the air-fuel ratio detected via the front A/F sensor 4 and the HC storage rate over time. In this routine, the HC storage amount found in this way is equivalent to the oxygen storage amount, i.e., the oxygen storage amount is decreased by the HC storage amount, and an amount obtained by subtracting the HC storage amount HCS from the oxygen storage amount in this time (in this case, the high-speed component) is set as a new oxygen storage amount HO2 in a step S84.

As a result of decreasing the oxygen storage amount HO2 by the HC storage amount, the oxygen storage amount computed by the processing of FIG. 10 and preceding figures is modified to an amount close to the real value, the actual efficiency of air-fuel ratio control which controls the oxygen storage amount to a target amount improves, and exhaust emission performance is definitely improved.

According to this embodiment, a storage amount of non-oxygen components in the catalyst such as HC, is for example converted to the oxygen storage amount as assuming that the storage amount of the non-oxygen component is equivalent to the oxygen storage amount, and added as an error relative to the oxygen storage amount. In this way, the real oxygen storage amount computed by the processing of FIG. 10 and preceding figures can be more precisely controlled to the target amount. As the result, the actual efficiency of air-fuel ratio control which controls the oxygen storage amount to a target amount improves, and exhaust emission performance is definitely improved.

The storage amount of non-oxygen components may for example be found by integrating the storage rate of non-oxygen components by the catalyst 3, the air-fuel ratio and the air intake amount overtime. At this time, when the storage rate of non-oxygen components by the catalyst 3 varies due to catalyst temperature, it is desirable to perform the computation using the storage rate set according to the catalyst temperature so as to obtain a highly precise control result. Further, is it is desirable to start the correction of air-fuel ratio taking account of the non-oxygen component storage amount from the state where the oxygen storage amount is initialized (reset) to a minimum.

FIG. 13 and FIG. 14 are respectively second and third embodiments of the above processing routine, and have functions to correct the target A/F or front A/F sensor output based on the respective computed HC storage amounts. A step S91, S92, S93 of FIG. 13 or a step S101, S102, S103 of FIG. 14 are identical to the steps S81, S82, S83 of FIG. 12, the parts which differ being as follows.

In FIG. 13, the HC storage amount HCS computed by an identical competition to that of FIG. 12 is converted to the air-fuel ratio to correct the target A/F in steps S94, S95. Specifically, in the usual oxygen storage amount computation, although the oxygen storage amount of the catalyst 3 is decreased by the amount of HC absorbed, the HC storage amount is also computed as the oxygen storage amount, so the oxygen storage amount found by computation reaches a target amount (TGHO2) earlier than in actual amount. In this case, the air-fuel ratio supplied to the catalyst becomes richer when the oxygen storage amount is less than the target amount, and there is a risk that the conversion efficiency of the catalyst 3 may be impaired. Hence, in this processing, the target A/F is corrected to be leaner according to the HC storage amount, and the relative decrease of oxygen storage amount is thereby compensated.

In this embodiment, a target air-fuel ratio is corrected more in the lean direction the larger the storage amount of non-oxygen components, or the engine air-fuel ratio detection result is corrected in the rich direction. In this way, the real oxygen storage amount can be more precisely controlled to the target amount.

In FIG. 14, the HC storage amount HCS computed by the identical computation to that of FIG. 12 is converted to the air-fuel ratio, and the output of the A/F sensor 4 is corrected in steps S104, S105. The object of this is identical to that of FIG. 12, except that the whereas the processing of FIG. 13 is to correct the target A/F to modify the environmental air-fuel ratio of the catalyst 3, in this processing, the air-fuel ratio inside the catalyst 3 is optimized by correcting the detection result of an apparent air-fuel ratio. In other words, as the oxygen storage amount decreases by the HC storage amount as described above, the output of the front A/F sensor 4 is corrected to rich according to the HC storage amount HCS, so a deficiency in the oxygen storage amount is compensated by correcting the real air-fuel ratio inside the catalyst 3 towards lean.

Figure 16:
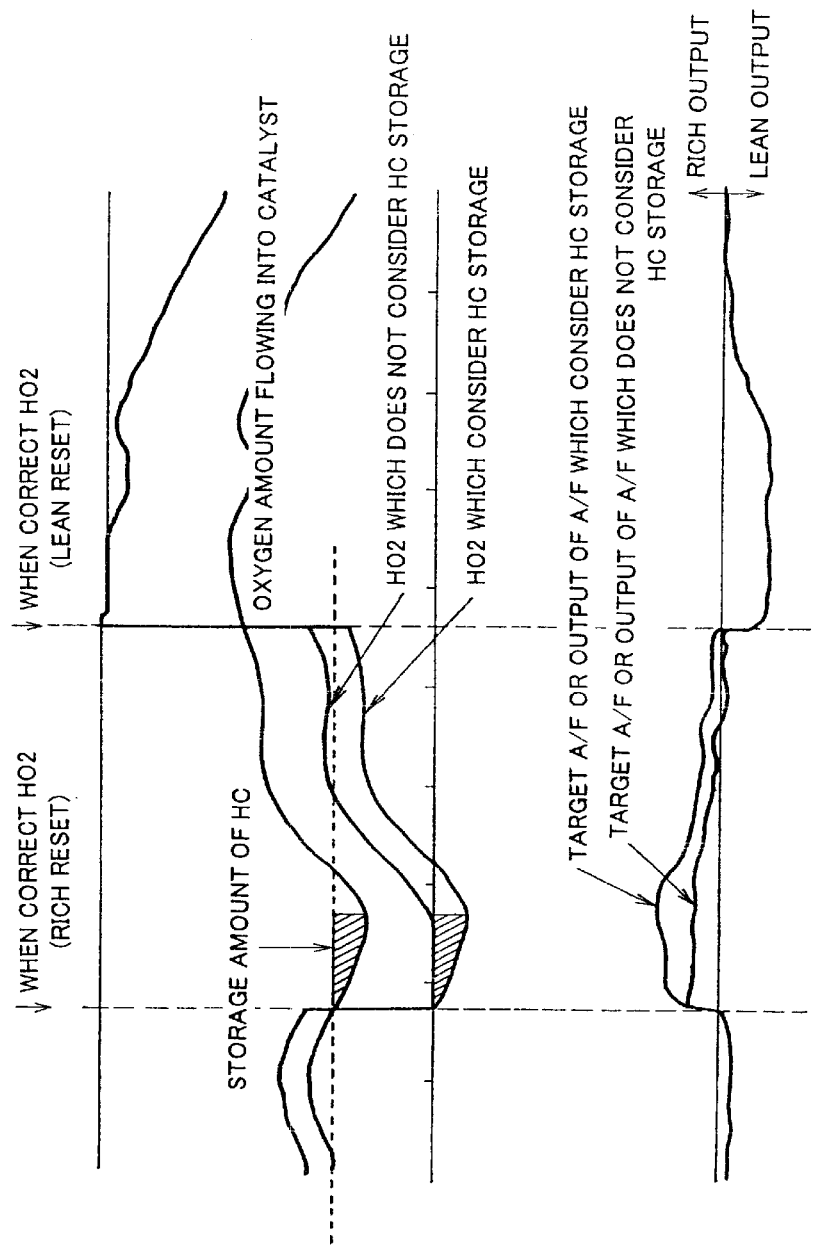
FIG. 16 is a time chart showing how an oxygen storage amount is controlled when control is performed according to the aforesaid third embodiment

FIG. 16 shows how the oxygen storage amount varies when correction of the front A/F sensor output according to the above HC storage amount is performed and when it is not performed. This shows the situation when the correction is initiated from the start point of reset processing in FIG. 8, FIG. 9 when the aforesaid sensor output inverts to rich. As seen from the figure, as the sensor output is apparently corrected toward rich, the oxygen storage amount required to make up for the decrease due to HC storage is provided.

The above embodiments assume that the HC storage amount is computed, however CO or the like may also be used as the non-oxygen component stored by the catalyst, and the oxygen storage amount may be further corrected taking these non-oxygen component into consideration.

The contents of Japanese Application No. 2000-47938, with a filing date Feb. 24, 2000, and Japanese Application No. 2001-38151, with a filing date Feb. 15, 2001, are hereby incorporated by reference.

What is claimed is:

1. An engine exhaust purification device comprising:
    a catalyst provided in an engine exhaust passage,
    a first sensor which detects an exhaust characteristic flowing into the catalyst,
    a second sensor which detects an exhaust characteristic flowing out of the catalyst, and
    a microprocessor programmed to:
        compute an oxygen storage amount of the catalyst using the detected exhaust characteristic,
        compute a storage amount of a non-oxygen component of the catalyst,
        control the air fuel ratio of the engine based on the computed oxygen storage amount and the computed non-oxygen component storage amount so that the oxygen storage amount of the catalyst is a target amount.

2. The engine exhaust purification device as defined in claim 1, wherein the microprocessor is further programmed to calculate the storage amount of the non-oxygen component by integrating the storage rate of the non-oxygen component by the catalyst, an air-fuel ratio and an intake air amount over time.

3. The engine exhaust purification device as defined in claim 1, wherein the microprocessor is further programmed to compute the HC storage amount of the catalyst.

4. The engine exhaust purification device for an engine as defined in claim 1, wherein the microprocessor is further programmed to convert the storage amount of the non-oxygen component to the oxygen storage amount assuming that the storage amount of the non-oxygen component is equivalent to the oxygen storage amount, and to correct the oxygen storage amount when the oxygen storage amount is controlled.

5. The engine exhaust purification device as defined in claim 1, wherein the microprocessor is further programmed to correct the target air fuel ratio to be leaner the more the storage amount of the non-oxygen component increases when the oxygen storage amount is controlled.

6. The engine exhaust purification device as defined in claim 1, wherein the microprocessor is further programmed to correct the air-fuel ratio detected by the first sensor to be richer the more the storage amount of the non-oxygen component increases when the oxygen storage amount is controlled.

7. The engine exhaust purification device as defined in claim 1, wherein the microprocessor is further programmed to perform correction of the oxygen storage amount according to the non-oxygen component storage amount when the air-fuel ratio is controlled from the state where the oxygen storage amount is initialized to a minimum amount.

8. The engine exhaust purification device as defined in claim 2, wherein the storage rate of the non-oxygen component is set according to the catalyst temperature.

9. The engine exhaust purification device as defined in claim 1, wherein the microprocessor is further programmed to compute the oxygen storage amount of the catalyst as a high-speed component which has a fast storage/release rate, and a low speed component which has a slower storage/release rate than the high-speed component.

10. The engine exhaust purification device as defined in claim 1, wherein the exhaust characteristic is an air-fuel ratio or an oxygen concentration.

11. An engine exhaust purification device comprising:

a catalyst provided in an engine exhaust passage, means for detecting an exhaust characteristic flowing into the catalyst, means for detecting an exhaust characteristic flowing out of the catalyst, and means for computing an oxygen storage amount of the catalyst using the detected exhaust characteristic, means for computing the storage amount of a non-oxygen component of the catalyst, means for controlling the air fuel ratio of the engine based on the computed oxygen storage amount and the computed non-oxygen component storage amount so that the oxygen storage amount of the catalyst is a target amount.

12. A method for controlling an air-fuel ratio of an engine which has a catalyst in an exhaust passage of the engine, comprising:

computing an oxygen storage amount of the catalyst using a detected exhaust characteristic, computing the storage amount of a non-oxygen component of the catalyst, controlling the air fuel ratio of the engine based on the computed oxygen storage amount and the computed non-oxygen component storage amount so that the oxygen storage amount of the catalyst is a target amount.

13. An engine exhaust purification device comprising:

a catalyst provided in an engine exhaust passage, a first sensor which detects an exhaust characteristic flowing into the catalyst, a second sensor which detects an exhaust characteristic flowing out of the catalyst, and a microprocessor programmed to:

compute an oxygen storage amount of the catalyst using the detected exhaust characteristic, compute the storage amount of a HC or a CO of the catalyst, control the air fuel ratio of the engine based on the computed oxygen storage amount and the computed HC or the CO storage amount so that the oxygen storage amount of the catalyst is a target amount.

14. An engine exhaust purification device comprising:

a catalyst provided in an engine exhaust passage, a first sensor which detects an exhaust characteristic flowing into the catalyst, a second sensor which detects an exhaust characteristic flowing out of the catalyst, and a microprocessor programmed to:

compute an oxygen storage amount of the catalyst using the detected exhaust characteristic, compute the storage amount of at least one of HC and CO of the catalyst, control the air fuel ratio of the engine based on the computed oxygen storage amount and the computed said at least one of said HC and CO storage amount so that the oxygen storage amount of the catalyst is a target amount.

* * * * *